(12) United States Patent
Amanuma et al.

(10) Patent No.: US 7,574,326 B2
(45) Date of Patent: Aug. 11, 2009

(54) SIGNAL PROCESSOR, METHOD OF SIGNAL PROCESSING AND COMPUTER PROGRAM

(75) Inventors: Teiji Amanuma, Kanagawa (JP); Hidetoshi Sugawara, Kanagawa (JP); Satoshi Arima, Kanagawa (JP); Kosuke Yoshizawa, Kanagawa (JP); Naoichi Hasegawa, Kanagawa (JP)

(73) Assignee: Ono Sokki Co., Ltd., Yokohama-Shi (JP)

( * ) Notice: Subject to any disclaimer, the term of this patent is extended or adjusted under 35 U.S.C. 154(b) by 253 days.

(21) Appl. No.: 11/545,694

(22) Filed: Oct. 11, 2006

(65) Prior Publication Data
US 2007/0086594 A1      Apr. 19, 2007

(30) Foreign Application Priority Data
Oct. 14, 2005   (JP)   ............................. 2005-300557

(51) Int. Cl.
*H03F 1/26*   (2006.01)
*G06F 11/30*   (2006.01)

(52) U.S. Cl. ........................ 702/189; 73/646; 73/866.1; 702/183

(58) Field of Classification Search ................... 702/56, 702/84, 111, 126, 182, 187, 183, 185; 73/489, 73/646, 866.1; 324/73.1, 76.22, 76.56; 381/56, 381/57, 151
See application file for complete search history.

(56) References Cited

U.S. PATENT DOCUMENTS

| 5,754,449 | A | 5/1998 | Hoshal et al. ............... 364/550 |
| 6,098,463 | A | 8/2000 | Goldberg ..................... 73/646 |
| 6,122,959 | A | 9/2000 | Hoshal et al. ................. 73/489 |
| 7,184,930 | B2 * | 2/2007 | Miyasaka et al. ........... 702/183 |

FOREIGN PATENT DOCUMENTS

| WO | WO 01/50098 A1 | 7/2001 |
| WO | WO 03/044466 A1 | 5/2003 |

OTHER PUBLICATIONS

European Search Report dated Feb. 9, 2007.

* cited by examiner

*Primary Examiner*—John H Le
(74) *Attorney, Agent, or Firm*—Kratz, Quintos & Hanson, LLP (57) ABSTRACT

A CPU generates the reference value (root mean squared value) of sound level and outputs it to a DSP, the DSP generates a measured value of sound level (root mean squared value), and compares thus-generated measured value of sound level (root mean squared value) with the reference value (root mean squared value) of sound level received from the CPU, and outputs a signal expressing the result of comparison to a display device, to thereby enable comparison of the measured value of sound level (root mean squared value) with the reference value (root mean squared value) of sound level, every time the sampling takes place in synchronization with the sampling frequency in the A/D converter.

11 Claims, 6 Drawing Sheets

| n | ROOT MEAN SQUARED VALUE "A" | AMOUNT OF ATTENUATION RELATIVE TO FULL SCALE | B |
|---|---|---|---|
| 0 | 1073676289 | 0 | 0 |
| 1 | 1049236433 | −0.1 | 0.977237221 |
| 2 | 1025352896 | −0.2 | 0.954972586 |
| 3 | 1002013014 | −0.3 | 0.933254301 |
| ⋮ | ⋮ | ⋮ | ⋮ |
| 99 | 109868542 | −9.9 | 0.102329299 |
| 100 | 107367629 | −10.0 | 0.1 |

SIGNAL PROCESSOR, METHOD OF SIGNAL PROCESSING AND COMPUTER PROGRAM

CROSS-REFERENCE TO RELATED APPLICATIONS

This application is based upon and claims the benefit of priority from the prior Japanese Patent Application No. 2005-300557, filed on Oct. 14, 2005, the entire contents of which are incorporated herein by reference.

BACKGROUND OF THE INVENTION

1. Field of the Invention

The present invention relates to a signal processor, a method of signal processing and a computer program, and in particular to those preferably applicable to processing of measured value of physical quantities based on analog-to-digital signal conversion.

2. Description of the Related Art

There are conventionally known measurement devices capable of measuring physical quantities such as noise, vibration and so forth, comparing measured results of the physical quantities with reference values, and displaying the compared results on display devices. This sort of measurement devices can readily inform the user whether the measured physical quantities exceed the reference value or not.

Figure 6:
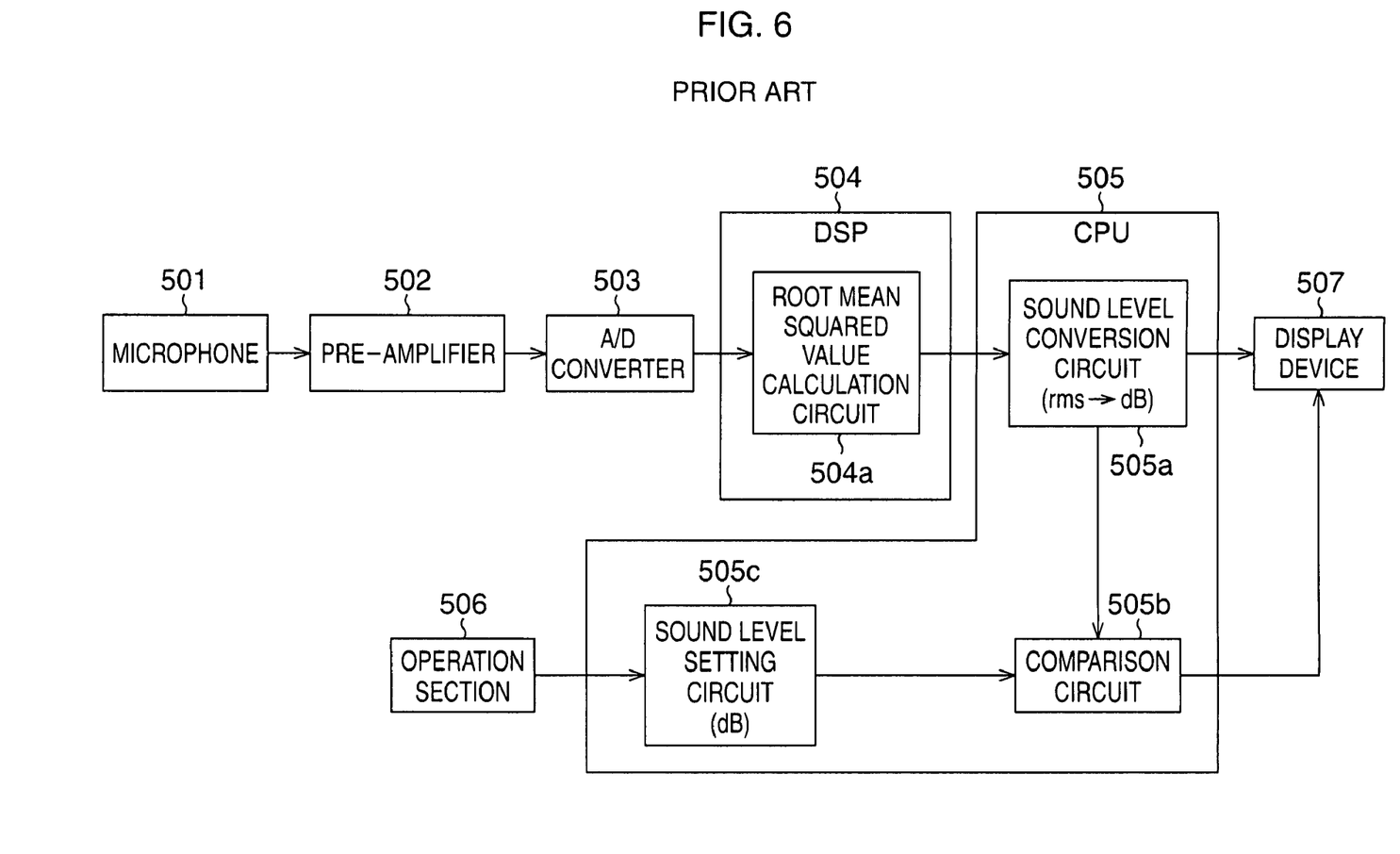
FIG. 6 is a block diagram showing a conventional configuration of a noise level meter, according to the conventional art.

FIG. 6 shows a conventional configuration of a noise level meter as one example of such measurement devices. As shown in FIG. 6, the noise level meter is configured as having a microphone 501, a pre-amplifier 502, an A/D converter 503, a DSP (digital signal processor) 504, a CPU (central processing unit) 505, an operation section 506, and a display device 507.

A sound signal detected and converted to a voltage signal by the microphone 501 is amplified by the pre-amplifier 502, and thereby an analog sound level signal is generated. The analog sound level signal is converted to a digital sound level signal by the A/D converter 503, and is output to the DSP 504. A root mean squared value calculation circuit 504a provided to the DSP 504 derives a root mean squared value (linear value) of sound level from the digital sound level signal output from the A/D converter 503, and outputs the result to the CPU 505.

A sound level conversion circuit 505a provided to the CPU 505 converts the root mean squared value of sound level output from the root mean squared value calculation circuit 504a into a dB (decibel) value (log value), and outputs the result to the display device 507, and also to a comparison circuit 505b provided to the CPU 505. The display device 507 displays the dB value of sound level output from the sound level conversion circuit 505a.

On the other hand, the comparison circuit 505b compares the dB value of sound level output from the sound level conversion circuit 505a, with a dB value of sound level set, in response to operation made on the operation section 506, by a sound level setting circuit 505c provided to the CPU 505. More specifically, the comparison circuit 505b compares the measured value of sound level based on sound detected by the microphone 501, with a reference value of sound level set by the user using the operation section 506. The comparison circuit 505b then outputs the result of comparison to the display device 507. The display device 507 displays the result of output from the comparison circuit 505b, together with the above-described dB value of sound level.

As has been described in the above, the measurement devices such as noise level meter uses both of the DSP 504 and the CPU 505 for a variety of operations. Speed of processing is, however, generally larger in the DSP 504 than in the CPU 505, so that it is necessary for the DSP 504 to output signals to the CPU 505 at predetermined intervals (10 ms to 100 ms, for example).

In the exemplary noise level meter shown in FIG. 6, the sound level determined by the root mean squared value calculation circuit 504a is output to the sound level conversion circuit 505a at regular intervals. Therefore, the root mean squared value of sound level based on the sound detected by the microphone 501 cannot be input to the sound level conversion circuit 505a in a real-time manner, and instead a certain duration of time is necessary before the dB value of sound level is obtained by the sound level conversion circuit 505a. For this reason, the comparison circuit 505b is made wait before starting its operation, until the dB value of sound level is input to the sound level conversion circuit 505a. This configuration may result in a large time lag between the point of time when the sound was picked up by the microphone 501, and the point of time when the comparison took place in the comparison circuit 505b or when the display took place in the display device 507, and may interfere with correct measurement.

As has been described in the above, the related art has been suffering from a problem in that it would be impossible to compare the measured value of a physical quantity and the reference value of the physical quantity in a real-time manner.

SUMMARY OF THE INVENTION

The present invention was conceived after observing the above-described problems, and is aimed at enabling real-time-as-possible comparison between the measured value of a physical quantity and the reference value of the physical quantity.

According to the present invention, there is provided a signal processor which includes a conversion unit sampling an analog signal expressing a measured value of a physical quantity at a predetermined frequency, and digitizing it; a comparison unit comparing the measured value of the physical quantity digitized by the conversion unit with a reference value of the physical quantity; and an announcement unit announcing information based on the result of comparison obtained from the comparison unit, wherein the comparison unit compares the measured value of the physical quantity digitized by the conversion unit with the reference value of the physical quantity, every time the sampling is executed by the conversion unit.

According to the present invention, there is also provided a method of signal processing which includes a conversion step sampling an analog signal expressing a measured value of a physical quantity at a predetermined frequency, and digitizing it; a comparison step comparing the measured value of the physical quantity digitized in the conversion step with a reference value of the physical quantity; and an announcement step announcing information based on the result of comparison obtained from the comparison step, wherein the comparison step compares the measured value of the physical quantity digitized in the conversion step with the reference value of the physical quantity, every time the sampling is executed in the conversion step.

According to the present invention, there is still also provided a computer program allowing a computer to execute a conversion step sampling an analog signal expressing a measured value of a physical quantity at a predetermined frequency, and digitizing it; a comparison step comparing the measured value of the physical quantity digitized in the conversion step with a reference value of the physical quantity; and an announcement step announcing information based on the result of comparison obtained from the comparison step, wherein the comparison step compares the measured value of the physical quantity digitized in the conversion step with the reference value of the physical quantity, every time the sampling is executed in the conversion step.

DETAILED DESCRIPTION OF THE PREFERRED EMBODIMENTS

Paragraphs below will explain embodiments of the present invention, referring to the attached drawings. The embodiments will explain the case where the signal processor is a noise level meter, as one example of the measurement devices.

Figure 1:
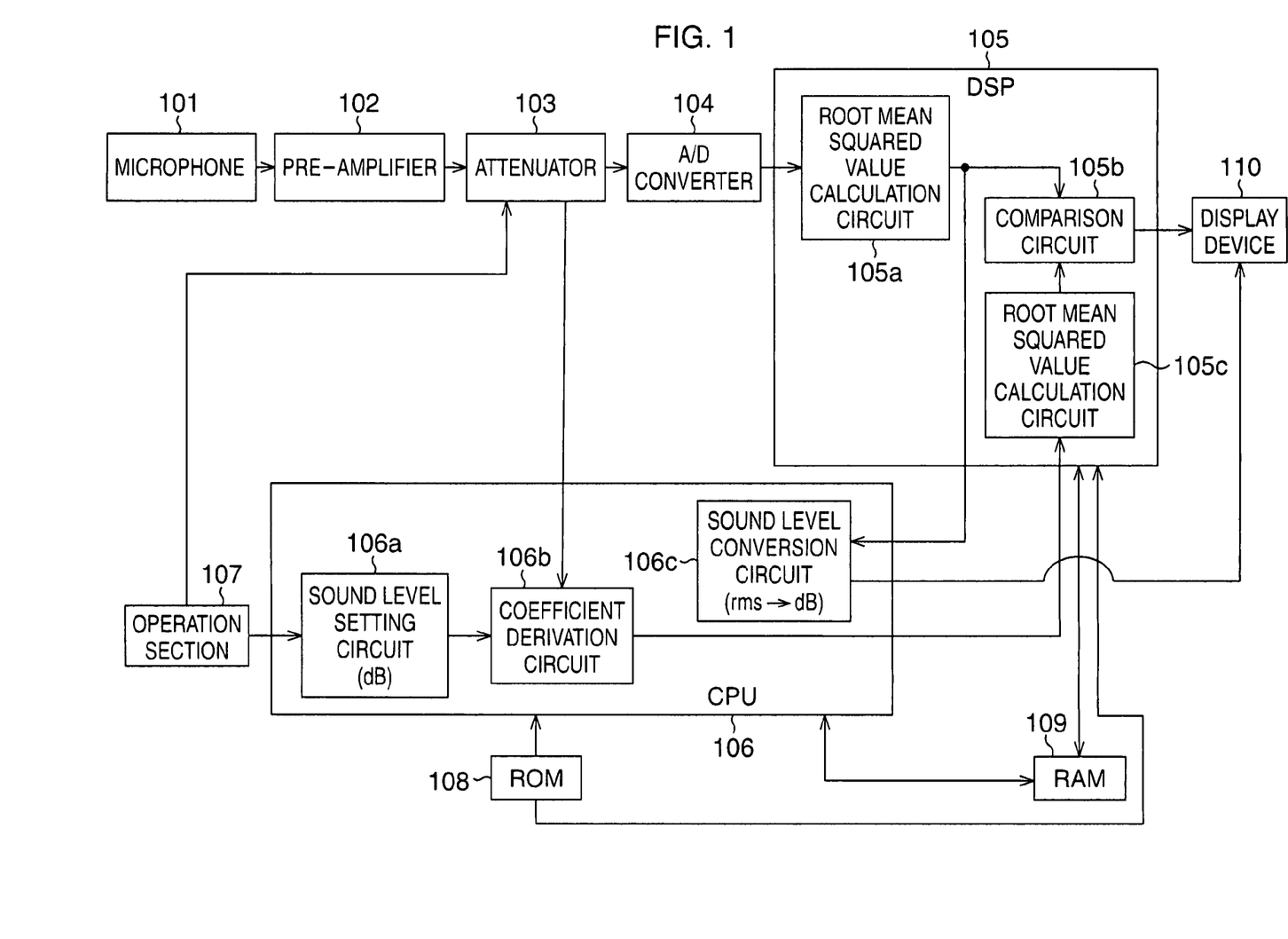
FIG. 1 is a block diagram showing an exemplary configuration of a noise level meter, according to one embodiment of the present invention.

FIG. 1 is a block diagram showing an exemplary configuration of the noise level meter.

As shown in FIG. 1, the noise level meter has a microphone 101, a pre-amplifier 102, an attenuator 103, an A/D converter 104, a DSP (digital signal processor) 105, a CPU (central processing unit) 106, an operation section 107, a ROM 108, a RAM 109 and a display device 110.

The microphone 101 is provided for detecting sound to be measured. The microphone 101 typically has a diaphragm and an electrode provided at a position opposed to the diaphragm. The microphone 101 in this embodiment detects changes in the capacitance formed by the air between the diaphragm and the electrode to thereby produce a sound signal in a form of voltage signal, and outputs thus-produced sound signal to the pre-amplifier 102.

The pre-amplifier 102 amplifies the sound signal produced by the microphone 101 to thereby produce an analog sound level signal, and outputs it to the attenuator 103.

The attenuator 103 adjusts the analog sound level signal produced by the pre-amplifier 102, depending on the range (measurement range) of sound level set based on an operation by the user made on the operation section 107, and outputs a result to the A/D converter 104. The attenuator 103 outputs a signal expressing the range (measurement range) of sound level set by the user to a sound level conversion circuit 106b provided to the CPU 106.

In this embodiment, the range of sound level (measurement range) is selectable through operation by the user made on the operation section 107, from any one of the ranges from 30 dB to 100 dB, from 40 dB to 110 dB, from 50 dB to 120 dB, and from 60 dB to 130 dB, both ends inclusive for all ranges.

The A/D converter 104 samples the analog sound level signal, having the level already adjusted by the attenuator 103, at a predetermined sampling frequency (predetermined frequency) and converts it to a digital sound level signal, and outputs it to the DSP 105. In this embodiment, the A/D converter 104 typically carries out the sampling at a sampling frequency of 64 kHz, and produces a 16-bit digital sound level signal for every sampling.

The DSP 105 has root mean squared value calculation circuits 105a, 105c, and a comparison circuit 105b. The CPU 106 has a sound level setting circuit 106a, a coefficient derivation circuit 106b, and a sound level conversion circuit 106c.

The root mean squared value calculation circuit 105a determines a root mean squared value (linear value) of sound level, based on the digital sound level signal output from the A/D converter 104.

Figure 2:
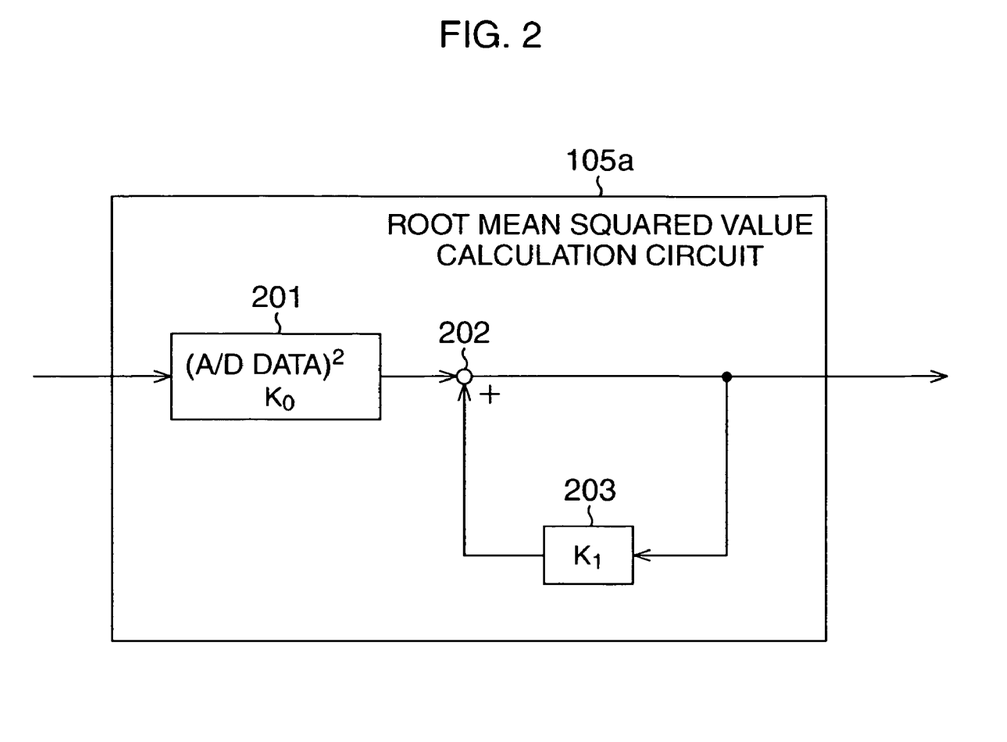
FIG. 2 is a block diagram explaining an outline of an exemplary operation executed by a root mean squared value calculation circuit, according to one embodiment of the present invention.

FIG. 2 is a block diagram explaining an outline of an exemplary operation executed by the root mean squared value calculation circuit 105a. FIG. 2 herein shows only an essential portion of the operation executed by the root mean squared value calculation circuit 105a, and the root mean squared value calculation circuit 105a may execute various operations other than that shown in FIG. 2.

As shown in FIG. 2, the root mean squared value calculation circuit 105a has a computing unit 201, an adder 202 and a multiplier 203.

The computing unit 201 squares the sound level signal (A/D data) output from the A/D converter 104, and multiplies the squared signal by a time constant $K_0$ which determines the rise-up time of the signal, and output the result.

The adder 202 sums up the signal output from the computing unit 201 and the signal output from the multiplier 203, and outputs the result to the external (the comparison circuit 105 and the sound level conversion circuit 106c), and also to the multiplier 203.

The multiplier 203 multiplies the signal output from the adder 202 by a time constant $K_1$ which determines the fall-down time of the signal, and outputs the result again back to the adder 202.

In this way, the root mean squared value calculation circuit 105a in this embodiment is configured as determining the measured value of sound level (root mean squared value) output from the adder 203, every time the sampling takes place in the A/D converter 104.

Referring now back to FIG. 1, the operation section 107 is a user interface, and typically has a dial switch, button switches and so forth. The user can operate the operation section 107, to thereby set the above-described ranges of the sound level (measurement range), the reference value (dB value) of sound level, and so forth.

The sound level setting circuit 106a sets the reference value of sound level as a dB value (log value), based on the user's operation made on the operation section 107. The setting is realized typically by allowing the RAM 109 to store the reference value of sound level.

The coefficient derivation circuit 106b derives coefficients to be set on the root mean squared value calculation circuit 105c provided to the DSP 105. Paragraphs below will explain an exemplary operation of the coefficient derivation circuit 106b, referring to the case where the sound level was set to 100.1 dB in the range from 50 dB to 120 dB, both ends inclusive. The noise level meter in this embodiment is assumed herein as having a full scale of 130 dB in the range from 50 dB to 120 dB.

First, the coefficient derivation circuit 106b calculates the amount of attenuation relative to the full scale. In the above-described example, the amount of attenuation relative to the full scale is obtained as 29.9 dB (=130-100.1). Next, the coefficient derivation circuit 106b divides the amount of attenuation relative to the full scale into the tens digit and the units digit or below. In the above-described example, 29.9 is divided into 20 and 9.9.

Next, the coefficient derivation circuit 106b outputs a value obtained by dividing the tens digit of the amount of attenuation relative to the full scale by 10 (referred to as coefficient "a", hereinafter), and a value obtained by multiplying the units digits or below of the amount of attenuation relative to the full scale by 10 (referred to as coefficient "b", hereinafter), as the coefficients to be set on the root mean squared value calculation circuit 105c provided to the DSP 105. In the above-described example, 2 (=20÷10) and 99 (=9.9×10) are respectively output as the coefficients "a" and "b" to be set on the mean squared value calculation circuit 105c provided to the DSP 105.

Figure 3:
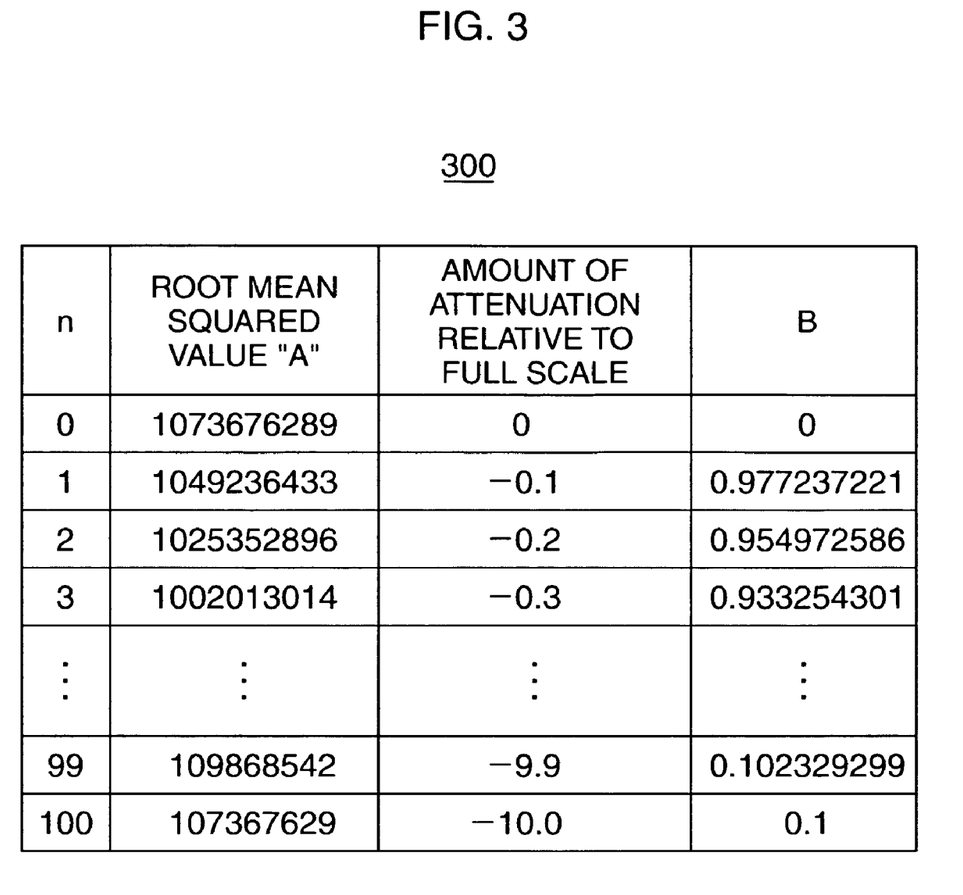
FIG. 3 is a chart conceptually showing an exemplary composition of a table used for conversion of measured value of sound level from dB value to root mean squared value, according to one embodiment of the present invention.

The root mean squared value calculation circuit 105c determines a root mean squared value of sound level (reference value of sound level), using the coefficients "a" and "b" output from the coefficient derivation circuit 106b, and a table shown in FIG. 3. The table 300 shown in FIG. 3 is stored typically in the ROM 108.

In the specific example described in the above, the root mean squared value "A" (=1073676289) corresponding to the full scale is multiplied by the value "B" (=0.1) corresponding to an amount of attenuation relative to the full scale of –10 dB, repeated number of times expressed by the coefficient "a" (=2) (=1073676289×0.1×0.1) The value obtained by the multiplication (=1073676289×0.1×0.1) is further multiplied by the value "B" (=0.102329299) corresponding to the case where address "n" has a value of the coefficient b (=99) (for the case where the amount of attenuation relative to the full scale is –9.9) (=1073676289×0.1×0.1×0.102329299). This value represents a root mean squared value of sound level (reference value of the sound level) determined by the root mean squared value calculation circuit 105c.

It is to be understood that the root mean squared value "A" corresponded to the full scale varies depending on the set range. This embodiment exemplifies the case where the amount of attenuation relative to the full scale varies by a 0.1 pitch in the table 300, whereas the amount of attenuation relative to the full scale may vary by a 0.01 pitch. This embodiment used the table 300, whereas the root mean squared value calculation circuit 105c may calculate the values registered in the table 300. The coefficient "b" described in the above was obtained by multiplying the units digits or below of the amount of attenuation relative to the full scale by 10, whereas the coefficient "b" may be just the units digits or below of the amount of attenuation relative to the full scale.

The comparison circuit 105b compares the root mean squared value (measured value of sound level) of sound level determined by the root mean squared value calculation circuit 105a, with the root mean squared value (reference value of sound level) of sound level determined by the root mean squared value calculation circuit 105c, and outputs a signal expressing the result of comparison to the display device 110. The comparison circuit 105b typically outputs, as the signal expressing the result of comparison, a signal expressing whether the measured value of sound level exceeds the reference value of sound level or not, to the display device 110.

In this embodiment, the comparison circuit 105b is configured as outputting, to the display device 110, a signal corresponding to any changes in the relation of magnitude between the measured value of sound level and the reference value of sound level, after the changed relation of magnitude was held at least for a predetermined duration of time (200 ms, for example) since the change took place. If the measured value of sound level once exceeded the reference value of sound level, and then fell down to the reference value of sound level or below, before the predetermined duration of time elapses, the comparison circuit 105b does not output a signal expressing that the measured value of sound level exceeded the reference value of sound level. On the other hand, if the measured value of sound level once exceeded the reference value of sound level, and remained larger than the reference value of sound level, even after the predetermined duration of time elapsed, the comparison circuit 105b outputs a signal expressing that the measured value of sound level exceeded the reference value of sound level.

Through execution of the operations described in the above, the comparison circuit 105b is configured as executing comparison with the 16-bit sound level signal generated by the A/D converter 104, every time the sampling takes place in synchronization with the sampling frequency for A/D conversion by the A/D converter 104, and as finishing the comparison with the 16-bit sound signal generated in a single sampling, before the 16-bit sound level signal generated in the next sampling is output from the A/D converter 104.

The sound level conversion circuit 106c typically substitutes the measured value of sound level output from the root mean squared value calculation circuit 105a provided to the DSP 105 for a conversion equation stored typically in the ROM 108, to thereby converts the measured value of sound level from a root mean squared value to a dB value, and outputs the result to the display device 110. The sound level conversion circuit 106c herein may convert the measured value of sound level from a root mean squared value to a dB value, without using the conversion equation, but instead using a conversion table stored in the ROM 108.

The display device 110 typically has a CRT display, and a display controller controlling display operation on the CRT display. The display device 110 generates display data, based on the signal output from the comparison circuit 105b provided to the DSP 105, and the dB value of sound level output from the sound level conversion circuit 106c, and displays an image based on thus-generated display data. As described in the above, the signal output herein from the comparison circuit 105b is a signal expressing whether the measured value of sound level in the microphone 101 exceeds the reference value of sound level entered by the user using the operation section 107 or not.

The display device 110 then displays "H" on the CRT display when, for example, the measured value of sound level in the microphone 101 exceeds the reference value of sound level set by the user using the operation section 107, and displays "L" in other cases, together with the dB value of sound level measured by the microphone 101.

Figure 4:
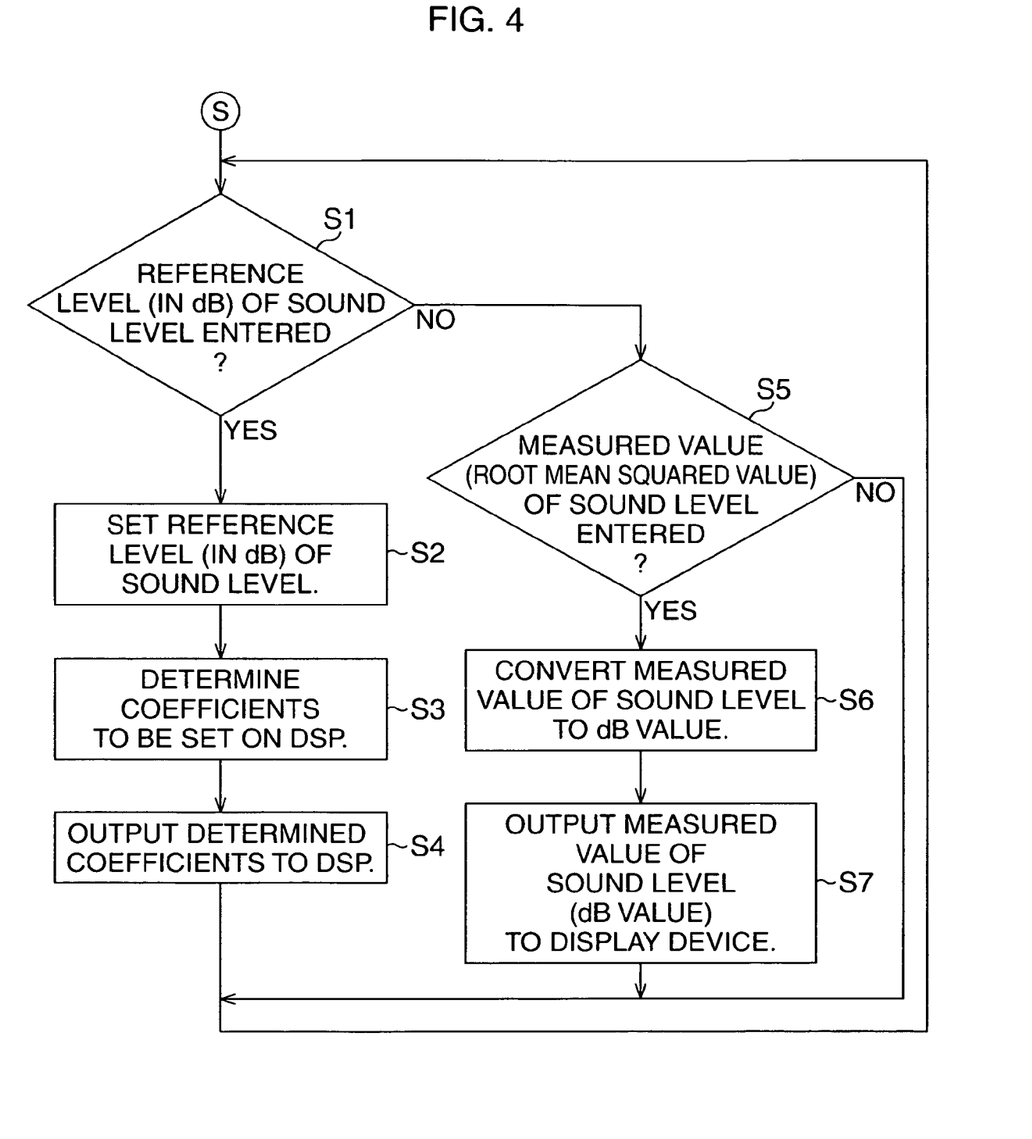
FIG. 4 is a flow chart explaining an exemplary processing executed in the CPU 106 provided to the noise level meter, according to one embodiment of the present invention.

Paragraphs below will explain an exemplary processing executed in the CPU 106 provided to the noise level meter of this embodiment, referring to the flow chart shown in FIG. 4.

First in step S1, the sound level setting circuit 106a judges whether the reference level (in dB) of sound level, based on operation made on the operation section 107 by the user, was entered as a dB value or not. If the judgment revealed that the reference value of sound level was not entered, the process advances to step S5 described later. On the other hand, if the reference value of sound level was entered, the process advances to step S2, wherein the sound level setting circuit 106a sets the reference level (in dB) of sound level, judged as being entered in step S1, typically in a form of storage in the RAM 109. The reference value of sound level is thus set as a dB value.

Next in step S3, the coefficient derivation circuit 106b acquires the range of sound level set by the user from the attenuator 103, and determines the coefficients "a" and "b" to be set on the root mean squared value calculation circuit 105c provided to the DSP 105, depending on thus-acquired range of sound level.

Next in step S4, the coefficient derivation circuit 106b outputs the coefficients "a", "b" determined in step S3, to the root mean squared value calculation circuit 105c provided to the DSP 105. The process then returns back to step S1.

If the judgment in step S1 revealed that the reference value of sound level was not entered, the process advances to step S5, wherein the sound level conversion circuit 106c judges whether the measured value of sound level (root mean squared value) was input or not, from the root mean squared value calculation circuit 105a provided to the DSP 105. If the judgment revealed that the measured value of sound level (root mean squared value) was not input, the process returns back to step S1. On the other hand, if the measured value of sound level (root mean squared value) was found to be input, the process advances to step S6, wherein the sound level conversion circuit 106c converts the measured value of sound level, judged in step S5 as being input, from a root mean squared value to a dB value. Next, in step S7, the sound level conversion circuit 106c outputs the measured value of sound level, already converted to the dB value in step S6, to the display device 110, and the process returns back to step S1. In this way, the display device 110 generates display data for displaying measured value of sound level as the dB value, and displays it.

Paragraphs below will explain an exemplary processing executed in the DSP 105 provided to the noise level meter of this embodiment, referring to the flow chart shown in FIG. 5.

First, in step S11, the root mean squared value calculation circuit 105a judges whether the digital sound level signal was input from the A/D converter 104 or not. If the judgment revealed that the digital sound level signal was input, the process advances to step S14 described later. On the other hand, if the digital sound level signal was not found to be input, the process advances to step S12, wherein the root mean squared value calculation circuit 105c judges whether the coefficients "a", "b" were input from the coefficient derivation circuit 106b or not. If the judgment revealed that the coefficients "a", "b" were not input, the process returns back to step S11.

On the other hand, if the coefficients "a", "b" were found to be input, the process advances to step S13, wherein the root mean squared value calculation circuit 105c determines the reference value (root mean squared value) of sound level, using the coefficients "a", "b", which were judged in step S12 as being input, and the table 300 shown in FIG. 3. Thus-determined reference value (root mean squared value) of sound level is stored in the RAM 109, for example, and the process returns back to step S1.

If the digital sound level signal was judged in step S11 as being input, the process advances to step S14, wherein the root mean squared value calculation circuit 105a determines the measured value of sound level (root mean squared value), based on the digital sound level signal which was judged in step S11 as being input.

Next, in step S15, the comparison circuit 105b judges whether comparison is necessary between the measured value of sound level (root mean squared value) determined in step S14 and the reference value (root mean squared value) of sound level. If the judgment was made so as not to compare the measured value of sound level (root mean squared value) with the reference value (root mean squared value) of sound level, the process returns back to step S11. On the other hand, for the case where the measured value (root mean squared value) of sound level and the reference value (root mean squared value) need be compared, the process advances to step S16, wherein the comparison circuit 105b compares the measured value of sound level (root mean squared value) determined in step S14, with the reference value (root mean squared value) of sound level stored in step S13.

Next, in step S17, the comparison circuit 105b judges whether the result of comparison obtained in step S16 was held for a predetermined duration of time or not. If the judgment revealed that the result of comparison was held for a predetermined duration of time, the process advances to step S18. On the other hand, if the result of comparison was not held for a predetermined duration of time, the process returns back to step S11.

Next, in step S18, the comparison circuit 105b outputs a signal expressing the result of comparison obtained in step S16 to the display device. In this way, the display device 110 typically generates display data for displaying "H" for the case where the measured value of sound level is larger than the reference value of sound level, and for displaying "L" for the other cases, and displays it.

As has been described in the above, the CPU 106 in this embodiment determines the coefficients. "a", "b", which allow the DSP 105 to determine the root mean squared value of sound level, and outputs them to the DSP 105. On the other hand, the DSP 105 generates the measured value of sound level (root mean squared value), compares thus-generated measured value of sound level (root mean squared value) with the reference value (root mean squared value) of sound level determined by using the coefficients "a", "b" received from the CPU 106 and the table 300, and outputs a signal expressing the result of comparison to the display device 110. In this way, the measured value of sound level (root mean squared value) and the reference value (root mean squared value) of sound level can be compared every time the sampling takes place in synchronization with the sampling frequency in the A/D converter 104. The measured value and the reference value of sound level can therefore be compared as real-time as possible, and so that any erroneous measurement ascribable to delayed comparison between the measured value and the reference value of sound level is avoidable as possible.

The noise level meter of this embodiment shown in FIG. 1 additionally has the coefficient derivation circuit 106b as compared with the conventional noise level meter shown in FIG. 6, wherein the coefficient derivation circuit 106b takes part in relatively simple calculation as described in the above, and can therefore operate the DSP 105 and the CPU 106 without causing too much load on the processing.

The comparison circuit 105b was configured as outputting, to the display device 110, a signal corresponding to any changes in the relation of magnitude between the measured value of sound level and the reference value of sound level, after the changed relation of magnitude was held at least for a predetermined duration of time since the change took place, so that the comparison circuit 105b can output the result of comparison between the measured value of sound level and the reference value, in response to changes in the sound level. In this way, the result of comparison between the measured value of sound level and the reference value can be displayed in a more accurate and more real-time manner.

The DSP 105 in this embodiment was configured as determining the root mean squared value of sound level based on the digital sound level signal output from the A/D converter 104, whereas it is also allowable to determine a peak value (amplitude value of example) of sound level in place of, or in addition to, the root mean squared value of sound level, and to compare the peak value of sound level with the reference value.

It is still also allowable to provide an octave BPF (band pass filter) between the A/D converter 104 and the DSP 105 shown in FIG. 1. This configuration allows octave analysis (frequency analysis of noise), for example.

It is not always necessary for the comparison circuit 105*b* to be configured as outputting, to the display device 110, a signal corresponding to any changes in the relation of magnitude between the measured value of sound level and the reference value of sound level, after the changed relation of magnitude was held at least for a predetermined duration of time since the change took place. For example, the comparison circuit 105*b* may be configured as outputting a signal expressing any changes in the relation of magnitude between the measured value of sound level and the reference value of sound level, when the measured value of sound level exceeded a predetermined range on the basis of the reference value of sound level.

Although the measurement device was explained in this embodiment while exemplifying the noise level meter, the measurement device is by no means limited to the noise level meter. The measurement device can be configured as being other than the noise level meter, typically by providing, in place of the microphone 101, any other detection means suitable for physical quantities to be measured. A vibration mater is one example. The physical quantity processed by the noise level meter shown in FIG. 1 is not limited to sound level, and may be levels such as sound intensity [$W/m^2$].

Figure 5:
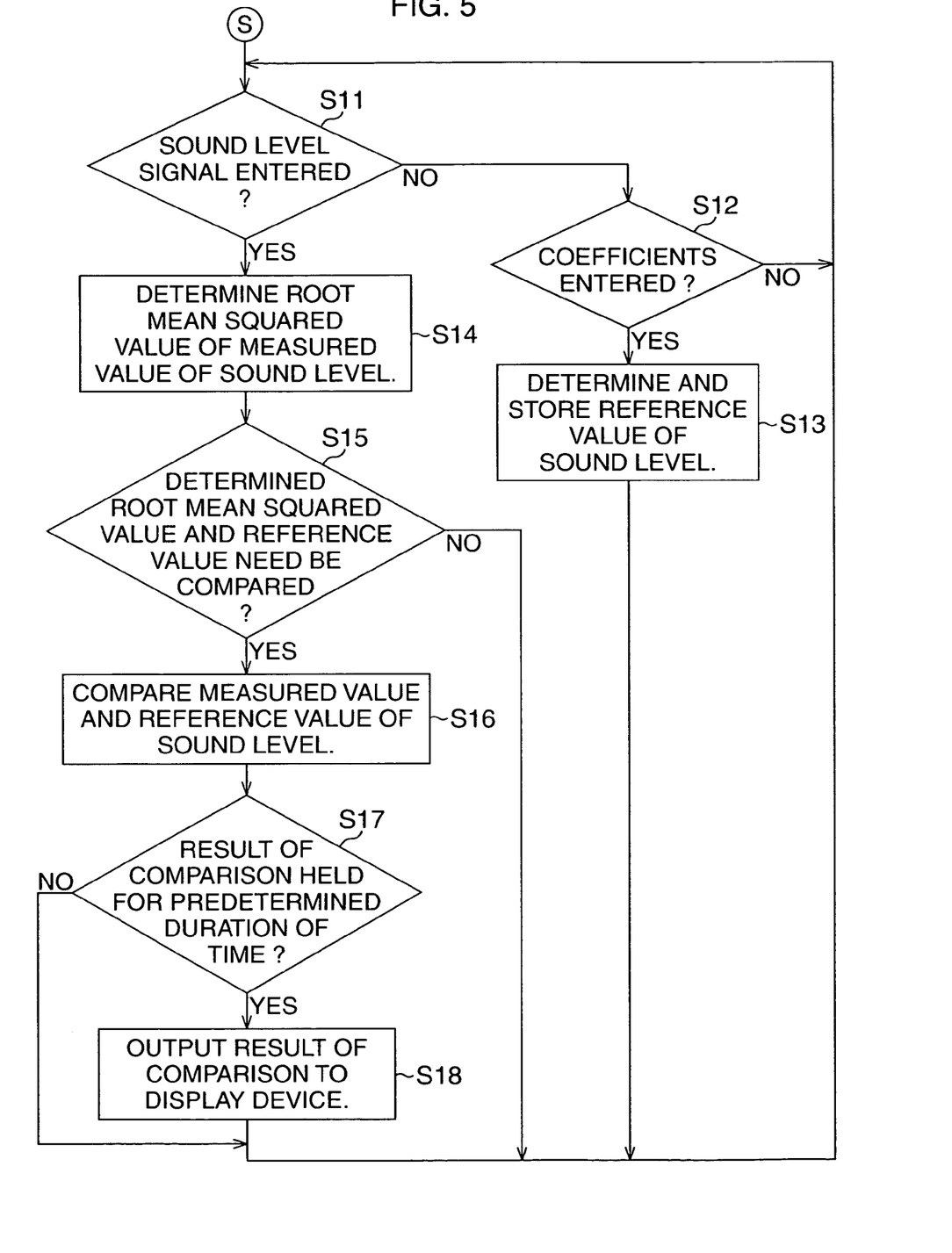
FIG. 5 is a flow chart explaining an exemplary processing executed in the DSP 105 provided to the noise level meter, according to one embodiment of the present invention.

The comparison circuit 105*b* in this embodiment was configured as judging, in step S15 in FIG. 5, whether the measured value of sound level (root mean squared value) determined in step S14 and the reference value (root mean squared value) of sound level need be compared or not, and as allowing the process to return back to step S11 if the judgment was such as making no comparison, but this configuration it not essential. One possible configuration is such that the processes in steps S14, S16 and S17 are unconditionally carried out, while skipping the process in step S15, upon reception of the reference value of sound level. Another possible configuration is such as outputting, to the display device 110, a signal expressing that the sound level and the reference value are not comparable, if the judgment was made so that the measured value of sound level (root mean squared value) and the reference value (root mean squared value) of sound level are not compared.

The coefficient derivation circuit 106*b* in this embodiment was configured as determining the coefficients "a", "b" based on the amount of attenuation relative to the full scale, whereas it is also allowable to determine only the amount of attenuation relative to the full scale, without determining the coefficients "a", "b", and to determine values corresponded to the coefficients "a", "b" using the root mean squared value calculation circuit 105*c*.

This embodiment was configured as outputting, to the display device 110, a signal corresponding to any changes in the relation of magnitude between the measured value of sound level and the reference value of sound level, after the changed relation of magnitude was held at least for a predetermined duration of time since the change took place, whereas the embodiment may be configured as unconditionally outputting the signal expressing the result of comparison to the display device 110. In this configuration, the processing in step S17 shown in FIG. 5 is no more necessary.

The embodiment of the present invention can be realized by a computer executing a program. Also means for supplying the program to the computer, which are for example computer-readable recording media such as CD-ROM having such program recorded therein, and transmission means for transmitting the program are also applicable as the embodiments of the present invention. Also program products such as computer-readable recording media, having the above-described program recorded therein, may be applicable as the embodiments of the present invention. All of the above-described program, computer-readable recording media, transmission media and program products are within the scope of the present invention.

It is to be understood that all of the above-described embodiments are merely for the purpose of showing specific examples carrying out the present invention, by which the present invention should not limitedly be interpreted. In other words, the present invention may be carried out in various ways without departing from the technical spirit thereof, or from principal features thereof.

The present invention is configured so that the measured value of the physical quantity is compared with the reference value of the physical quantity, every time the sampling takes place in order to digitize the analog signal expressing the measured value of the physical quantity, so that it is made possible to compare the measured value of the physical quantity with the reference value of the physical quantity as real-time as possible.

What is claimed is:

1. A signal processor comprising:
   a conversion unit sampling at a frequency and also digitizing at the frequency an analog signal related to a value of a physical quantity and outputting, at the frequency, a resulting digitized measured value of the physical quantity;
   a comparison unit comparing the outputted measured value of the physical quantity digitized by said conversion unit with a reference value of the physical quantity; and
   an announcement unit announcing information based on the result of comparison obtained from said comparison unit at the frequency,
   wherein said comparison unit compares, at the frequency, the measured value of the physical quantity digitized by said conversion unit with said reference value of the physical quantity, every time the sampling takes place, in synchronization with the sampling.

2. The signal processor according to claim 1, wherein said comparison unit compares a previously-input measured value of the physical quantity with said reference value of the physical quantity, before the next measured value of the physical quantity, sampled and digitized succeedingly to the previously-input measured value of the physical quantity, is output from said conversion unit.

3. The signal processor according to claim 1, further comprising:
   a first derivation unit deriving a root mean squared value or a peak value of the measured value of the physical quantity digitized by said conversion unit; and
   a second derivation unit deriving a reference value of the measured value of the physical quantity derived by said first derivation unit,
   wherein said comparison unit compares the root mean squared value or the peak value of the measured value of the physical quantity derived by said first derivation unit, with the reference value derived by said second derivation unit.

4. The signal processor according to claim 3, wherein said first derivation unit, said second derivation unit, and said comparison unit are included in a DSP (digital signal processor).

5. The signal processor according to claim 3, further comprising:
an operation unit operated by a user so as to enter, in decibel, the reference value of said physical quantity; and
a setting unit setting, in decibel, the reference value of said physical quantity, in response to the user's operation on said operation unit,
wherein said second derivation unit converts the reference value of the physical quantity set, in decibel, by said setting unit to the root mean squared value.

6. The signal processor according to claim 5, wherein said setting unit is included in a CPU (central processing unit).

7. The signal processor according to claim 5, wherein said first derivation unit, said second derivation unit and said comparison unit are included in a first processor having a relatively fast speed of processing, and said setting unit is included in a second processor having a relatively slow speed of processing.

8. The signal processor according to claim 1, wherein said comparison unit outputs, to a display device, information expressing any changes in the relation of magnitude between the measured value of the physical quantity digitized by said conversion unit and the reference value of said physical quantity, after the changed relation of magnitude was held at least for a duration of time since the change took place.

9. The signal processor according to claim 1, wherein said physical quantity is the one based on noise or vibration.

10. A method of signal processing comprising:
a conversion step sampling at a frequency and also digitizing at the frequency an analog signal related to a value of a physical quantity and outputting, at the frequency, a resulting digitized measured value of the physical quantity;
using a comparison unit for comparing the outputted measured value of the physical quantity digitized in said conversion step with a reference value of the physical quantity; and
an announcement step announcing information based on the result of comparison obtained from said comparison unit at the frequency,
wherein said comparison unit compares, at the frequency, the measured value of the physical quantity digitized in said conversion step with said reference value of the physical quantity, every time the sampling takes place, in synchronization with the sampling.

11. A computer program embedded in a computer readable medium or computer memory which allows the computer to execute:
a conversion step sampling at a frequency and also digitizing at the frequency an analog signal related to a value of a physical quantity and outputting, at the frequency, a resulting digitized measured value of the physical quantity;
using a comparison unit for comparing the outputted measured value of the physical quantity digitized in said conversion step with a reference value of the physical quantity; and
an announcement step announcing information based on the result of comparison obtained from said comparison unit at the frequency,
wherein said comparison unit compare, at the frequency, the measured value of the physical quantity digitized in said conversion step with said reference value of the physical quantity, every time the sampling takes place, in synchronization with the sampling.

* * * * *